United States Patent
Chen et al.

(10) Patent No.: US 10,555,043 B2
(45) Date of Patent: *Feb. 4, 2020

(54) METHOD FOR CONTENT-BASED NON-LINEAR CONTROL OF MULTIMEDIA PLAYBACK

(71) Applicant: AT&T Intellectual Property II, L.P., Atlanta, GA (US)

(72) Inventors: Edward Y. Chen, Holmdel, NJ (US); David Crawford Gibbon, Lincroft, NJ (US); Laurence W. Ruedisueli, Berkeley Heights, NJ (US); Behzad Shahraray, Freehold, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/420,315

(22) Filed: May 23, 2019

(65) Prior Publication Data
US 2019/0281358 A1 Sep. 12, 2019

Related U.S. Application Data

(63) Continuation of application No. 15/819,156, filed on Nov. 21, 2017, now Pat. No. 10,306,322, which is a (Continued)

(51) Int. Cl.
*H04N 21/472* (2011.01)
*G06F 16/74* (2019.01)
(Continued)

(52) U.S. Cl.
CPC ....... *H04N 21/47217* (2013.01); *G06F 16/40* (2019.01); *G06F 16/44* (2019.01);
(Continued)

(58) Field of Classification Search
None
See application file for complete search history.

(56) References Cited

U.S. PATENT DOCUMENTS 5,132,992 A 7/1992 Yurt et al.
5,410,326 A 4/1995 Goldstein
(Continued)

*Primary Examiner* — An Son P Huynh

(57) ABSTRACT

A system and method are provided for content-based non-linear control of video data playback. A multimedia database having multimedia data including multimedia content data is searched based on a user query to determine a first set of multimedia data. The multimedia data includes indexes to and condensed representations of corresponding video data stored in a video database. A portion of the first set of multimedia data is displayed at a control device in response to the user query. A user of the control device selects an element of the first set of multimedia data for video playback and video data corresponding to the element delivered to a video device for playback. A user of the control device selects an element of the first set of multimedia data for additional information and a second set of multimedia data corresponding to the element delivered to the control device.

20 Claims, 5 Drawing Sheets

Related U.S. Application Data continuation of application No. 15/296,182, filed on Oct. 18, 2016, now Pat. No. 9,832,529, which is a continuation of application No. 13/687,497, filed on Nov. 28, 2012, now Pat. No. 9,485,544, which is a continuation of application No. 10/146,300, filed on May 14, 2002, now Pat. No. 8,479,238.

(60) Provisional application No. 60/290,788, filed on May 14, 2001.

(51) Int. Cl.

| | | |
|---|---|---|
| *G06F 16/73* | (2019.01) | |
| *G06F 16/44* | (2019.01) | |
| *G06F 16/40* | (2019.01) | |
| *H04N 21/44* | (2011.01) | |
| *H04N 21/482* | (2011.01) | |
| *H04N 21/432* | (2011.01) | |
| *H04N 21/434* | (2011.01) | |
| *H04N 21/858* | (2011.01) | |
| *H04N 21/84* | (2011.01) | |
| *H04N 21/6587* | (2011.01) | |
| *H04N 21/4782* | (2011.01) | |
| *H04N 21/462* | (2011.01) | |
| *H04N 21/414* | (2011.01) | |
| *H04N 21/278* | (2011.01) | |
| *H04N 21/266* | (2011.01) | |
| *H04N 21/2343* | (2011.01) | |
| *H04N 7/173* | (2011.01) | |
| *G06F 16/738* | (2019.01) | |
| *H04N 5/44* | (2011.01) | |

(52) U.S. Cl.
CPC ............ *G06F 16/73* (2019.01); *G06F 16/738* (2019.01); *G06F 16/74* (2019.01); *H04N 7/17336* (2013.01); *H04N 21/23439* (2013.01); *H04N 21/26603* (2013.01); *H04N 21/278* (2013.01); *H04N 21/41407* (2013.01); *H04N 21/432* (2013.01); *H04N 21/4345* (2013.01); *H04N 21/44008* (2013.01); *H04N 21/4622* (2013.01); *H04N 21/4782* (2013.01); *H04N 21/47202* (2013.01); *H04N 21/4821* (2013.01); *H04N 21/4828* (2013.01); *H04N 21/6587* (2013.01); *H04N 21/84* (2013.01); *H04N 21/8586* (2013.01); *H04N 5/4401* (2013.01)

(56) References Cited

U.S. PATENT DOCUMENTS

| | | |
|---|---|---|
| 5,459,530 A | 10/1995 | Andersson |
| 5,539,479 A | 7/1996 | Bertram |
| 5,553,221 A | 9/1996 | Reimer |
| 5,572,260 A | 11/1996 | Onishi et al. |
| 5,606,359 A | 2/1997 | Youden et al. |
| 5,610,653 A | 3/1997 | Abecassis |
| 5,619,249 A | 4/1997 | Billock et al. |
| 5,793,366 A | 8/1998 | Mano |
| 5,818,439 A | 10/1998 | Nagasaka et al. |
| 5,835,667 A | 11/1998 | Wactlar et al. |
| 5,844,620 A | 12/1998 | Coleman |
| 5,854,894 A | 12/1998 | Lancaster et al. |
| 5,864,682 A | 1/1999 | Porter et al. |
| 5,877,755 A | 3/1999 | Helhake |
| 5,883,621 A | 3/1999 | Iwamura |
| 5,884,056 A | 3/1999 | Steele |
| 5,900,867 A | 5/1999 | Schindler |
| 5,900,868 A | 5/1999 | Duhault et al. |
| 5,917,488 A | 6/1999 | Anderson et al. |
| 5,966,122 A | 10/1999 | Itoh |
| 5,987,154 A | 11/1999 | Gibbon |
| 5,995,155 A | 11/1999 | Schindler |
| 6,061,056 A | 5/2000 | Menard et al. |
| 6,098,082 A | 8/2000 | Gibbon |
| 6,104,334 A | 8/2000 | Allport |
| 6,118,450 A | 9/2000 | Proehl et al. |
| 6,119,154 A | 9/2000 | Weaver et al. |
| 6,130,726 A | 10/2000 | Darbee |
| 6,139,197 A | 10/2000 | Banks |
| 6,144,375 A | 11/2000 | Jain et al. |
| 6,154,600 A | 11/2000 | Newman et al. |
| 6,154,771 A | 11/2000 | Rangan et al. |
| 6,173,317 B1 | 1/2001 | Chaddha et al. |
| 6,185,573 B1 | 2/2001 | Angelucci et al. |
| 6,188,398 B1 | 2/2001 | Collins-Rector et al. |
| 6,236,395 B1 | 5/2001 | Sezan et al. |
| 6,266,094 B1 | 7/2001 | Taylor, Jr. |
| 6,271,892 B1 | 8/2001 | Gibbon et al. |
| 6,278,499 B1 | 8/2001 | Darbee |
| 6,314,398 B1 | 11/2001 | Junqua et al. |
| 6,317,710 B1 | 11/2001 | Huang |
| 6,330,603 B1 | 12/2001 | Seki |
| 6,333,739 B1 | 12/2001 | Koyama |
| 6,342,904 B1 | 1/2002 | Vasudevan et al. |
| 6,349,410 B1 | 2/2002 | Lortz |
| 6,405,371 B1 | 6/2002 | Oosterhout et al. |
| 6,414,725 B1 | 7/2002 | Ciairin et al. |
| 6,415,326 B1 | 7/2002 | Gupta et al. |
| 6,421,706 B1 | 7/2002 | McNeill et al. |
| 6,449,608 B1 | 9/2002 | Morita et al. |
| 6,470,378 B1 | 10/2002 | Tracton et al. |
| 6,473,778 B1 | 10/2002 | Gibbon |
| 6,476,825 B1 | 11/2002 | Croy |
| 6,509,908 B1 | 1/2003 | Croy et al. |
| 6,535,639 B1 | 3/2003 | Uchihachi et al. |
| 6,567,980 B1 | 5/2003 | Jain et al. |
| 6,580,437 B1 | 6/2003 | Liou et al. |
| 6,584,463 B2 | 6/2003 | Morita et al. |
| 6,601,103 B1 | 7/2003 | Goldschmidt et al. |
| 6,615,252 B1 | 9/2003 | Oka et al. |
| 6,631,523 B1 | 10/2003 | Matthews et al. |
| 6,637,032 B1 | 10/2003 | Feinleib |
| 6,668,377 B1 | 12/2003 | Dunn |
| 6,710,822 B1 | 3/2004 | Walker et al. |
| 6,711,741 B2 | 3/2004 | Yeo |
| 6,745,252 B1 | 6/2004 | Yanagawa |
| 6,757,907 B1 | 6/2004 | Schumacher et al. |
| 6,760,916 B2 | 7/2004 | Holtz et al. |
| 6,788,882 B1 | 9/2004 | Geer et al. |
| 6,789,106 B2 | 9/2004 | Eyer et al. |
| 6,829,781 B1 | 12/2004 | Bhagavath et al. |
| 6,844,886 B1 | 1/2005 | Yanagawa |
| 6,845,485 B1 | 1/2005 | Shastri |
| 6,870,573 B2 | 3/2005 | Yeo et al. |
| 6,877,134 B1 | 4/2005 | Fuller et al. |
| 6,880,171 B1 | 4/2005 | Ahmad et al. |
| 6,882,793 B1 | 4/2005 | Fu et al. |
| 6,918,132 B2 | 7/2005 | Gargi |
| 6,938,208 B2 | 8/2005 | Reichardt |
| 6,956,573 B1 | 10/2005 | Bergen et al. |
| 6,961,954 B1 | 11/2005 | Maybury et al. |
| 6,965,724 B1 | 11/2005 | Boccon-Gibod et al. |
| 6,968,366 B1 | 11/2005 | Zhang |
| 6,976,267 B1 | 12/2005 | Takano |
| 7,065,250 B1 | 6/2006 | Lennon |
| 7,073,127 B2 | 7/2006 | Zhao et al. |
| 7,107,532 B1 | 9/2006 | Billmaier et al. |
| 7,116,357 B1 | 10/2006 | Oya |
| 7,174,512 B2 | 2/2007 | Martin et al. |
| 7,178,107 B2 | 2/2007 | Sezan et al. |
| 7,200,857 B1 | 4/2007 | Rodriguez et al. |
| 7,231,603 B2 | 6/2007 | Matsumoto |
| 7,237,254 B1 | 6/2007 | Omoigui |
| 7,281,220 B1 | 10/2007 | Rashkovskiy |
| 7,293,280 B1 | 11/2007 | Gupta et al. |
| 7,301,944 B1 | 11/2007 | Redmond |
| 7,313,808 B1 | 12/2007 | Gupta et al. |
| 7,325,199 B1 | 1/2008 | Reid |
| 7,401,351 B2 | 7/2008 | Boreczky et al. |

(56) References Cited

U.S. PATENT DOCUMENTS

| | | |
|---|---|---|
| 7,690,017 B2 | 3/2010 | Stecyk |
| 7,765,574 B1 | 7/2010 | Maybury et al. |
| 7,877,774 B1 | 1/2011 | Basso |
| 7,895,624 B1 | 2/2011 | Thomas |
| 8,091,112 B1 | 1/2012 | Elliott et al. |
| 8,108,892 B1 | 1/2012 | Durkee |
| 8,214,422 B1 | 7/2012 | Woodward |
| 8,732,758 B2 | 5/2014 | Boyer |
| 2001/0043744 A1 | 11/2001 | Hieda |
| 2001/0049826 A1 | 12/2001 | Wilf |
| 2002/0039481 A1 | 4/2002 | Jun et al. |
| 2002/0051077 A1 | 5/2002 | Liou |
| 2002/0056098 A1 | 5/2002 | White |
| 2002/0059621 A1 | 5/2002 | Thomas |
| 2002/0069218 A1 | 6/2002 | Sull et al. |
| 2002/0078176 A1 | 6/2002 | Nomura et al. |
| 2002/0093591 A1 | 7/2002 | Gong |
| 2002/0097984 A1 | 7/2002 | Abecassis |
| 2002/0111968 A1 | 8/2002 | Ching |
| 2002/0150387 A1 | 10/2002 | Kunii |
| 2002/0163532 A1 | 11/2002 | Thomas |
| 2002/0170068 A1 | 11/2002 | Rafey et al. |
| 2002/0194151 A1 | 12/2002 | Fenton et al. |
| 2003/0066085 A1 | 4/2003 | Boyer et al. |
| 2003/0103088 A1 | 6/2003 | Dresti |
| 2003/0113100 A1 | 6/2003 | Hecht |
| 2003/0123850 A1 | 7/2003 | Jun |
| 2004/0117831 A1 | 6/2004 | Ellis et al. |
| 2004/0250272 A1 | 12/2004 | Durden et al. |
| 2005/0028194 A1 | 2/2005 | Elenbaas et al. |
| 2005/0028208 A1 | 2/2005 | Ellis et al. |
| 2005/0088333 A1 | 4/2005 | Allport |
| 2005/0210145 A1 | 9/2005 | Kim et al. |
| 2005/0229213 A1 | 10/2005 | Ellis et al. |
| 2005/0235319 A1 | 10/2005 | Carpenter et al. |
| 2005/0240961 A1 | 10/2005 | Jerding et al. |
| 2005/0251827 A1 | 11/2005 | Ellis |
| 2005/0262542 A1 | 11/2005 | DeWeese et al. |
| 2006/0059275 A1 | 3/2006 | Lefevre |
| 2006/0095937 A1 | 5/2006 | Knudson |
| 2006/0110136 A1 | 5/2006 | Abecassis |
| 2006/0129938 A1 | 6/2006 | Humpleman |
| 2006/0140584 A1 | 6/2006 | Ellis et al. |
| 2006/0242665 A1 | 10/2006 | Knee et al. |
| 2007/0061853 A1 | 3/2007 | Kondo |
| 2008/0086754 A1* | 4/2008 | Chen ............... H04L 29/06027 725/105 |
| 2009/0060450 A1 | 3/2009 | Daniels |

\* cited by examiner

METHOD FOR CONTENT-BASED NON-LINEAR CONTROL OF MULTIMEDIA PLAYBACK

PRIORITY INFORMATION

The present invention is a continuation of U.S. patent application Ser. No. 15/819,156, filed Nov. 21, 2017, which is a continuation of U.S. patent application Ser. No. 15/296,182, filed Oct. 18, 2016, which is a continuation of U.S. patent application Ser. No. 13/687,497, filed Nov. 28, 2012, now U.S. Pat. No. 9,485,544, issued Nov. 1, 2016, which is a continuation of U.S. patent application Ser. No. 10/146,300, filed May 14, 2002, now U.S. Pat. No. 8,479,238, issued Jul. 2, 2013, which is a non-provisional of U.S. Patent Provisional Application No. 60/290,788, filed May 14, 2001, the content of which are incorporated herein in their entireties by reference.

FIELD OF THE INVENTION

The present invention generally relates to the control and playback of user selected video material based on the content of the video material.

BACKGROUND OF THE INVENTION

Audio and video signal streams, whether carrying analog or digitally encoded information, have come to represent a significant source of consumer information and entertainment. Traditionally such signal streams were provided to consumers over radio frequency bands through use of a transmitter and a receiver. Changes in distribution methods have led to the use of various alternative devices such as cable set top boxes, video recorder/player devices such as cassette recorders and video disc players, or direct live video sources such as home cameras, game systems, and computers, and other alternative devices. As such devices have proliferated, so too have their associated control devices such that consumers are frequently faced with a proliferation of control devices. For example, in "home theater systems" having numerous interconnected devices, several or even all the devices may have its own control device which enables the consumer to control the functionality of the respective device remotely without directly manipulating controls on the device.

In addition, increased availability of networks for the transmission of signal streams has vastly increased the number and variety of information and entertainment services available to consumers. As a result, consumers have trouble keeping informed as to the scheduling of available services. Accordingly, some cable television systems provide a dedicated channel that displays a current programming guide for scheduled services. However, such a channel typically slowly scrolls a limited and fixed amount of information, usually only one to three hours of program scheduling. Moreover, these systems lack any user interface capability and cannot be customized to suit individual consumer's needs so that a consumer must inconveniently wait to potentially view information of interest and then, may not even be provided with information suited to their particular interests.

Some systems enable searching of displayed data, such as the title of a movie or the name of a song, associated with stored video data. However, such systems do not facilitate navigation of large aggregates of video material, or navigation within a particular video material entry, such as a single video program, to enable the consumer to find information of particular interest. A consumer will thus often times have to navigate linearly through a large amount of irrelevant video material in order to find desired video programming, wasting time and effort. Moreover, such excessive navigation likewise requires excessive bandwidth when in communication with a video server, failing to minimize the time necessary for video material retrieval, and thereby slowing the network over which such communication occurs.

SUMMARY OF THE INVENTION

A system and method are provided for content-based non-linear control of video data playback. A multimedia database having multimedia data including multimedia content data is searched based on a user-selected parameter to determine a first set of multimedia data. The multimedia data includes indices to information pertaining to the information content of corresponding video data stored in a video database. The multimedia data also includes condensed representations of corresponding video data, such as image scenes or closed captioned information concerning what was spoken in a image scene. A portion of the first set of multimedia data is displayed at a control device. A user of the control device selects an element of the first set of multimedia data for video playback and video data corresponding to the element delivered to a video device for playback. A user of the control device selects an element of the first set of multimedia data for additional information and a second set of multimedia data corresponding to the element delivered to the control device.

BRIEF DESCRIPTION OF THE DRAWINGS

Further aspects of the instant invention will be more readily appreciated upon review of the detailed description of the embodiments included below when taken in conjunction with the accompanying drawings, of which.

DETAILED DESCRIPTION OF THE INVENTION

Referring now to FIGS. 1-10, wherein similar components of the invention are numerically referenced in like manner, disclosed are embodiments of an architecture and method for accessing, over a network, user selected video data based on selected multimedia data.

Figure 1:
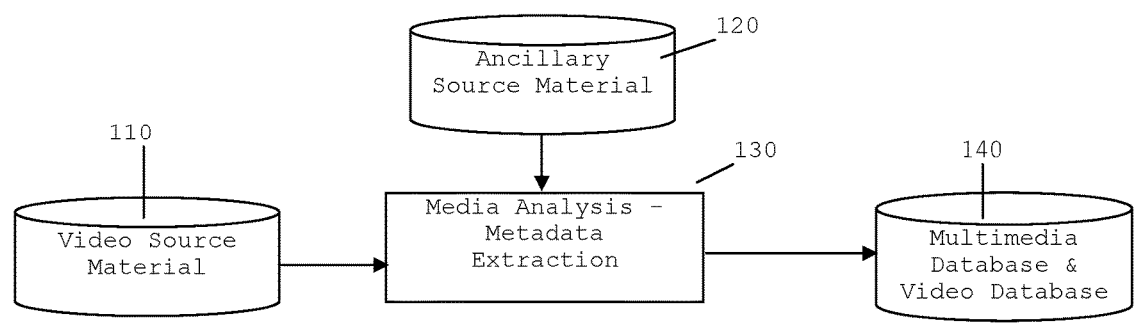
FIG. 1 illustrates an exemplary architecture for populating a multimedia system with detailed content specific information.

FIG. 1 illustrates an exemplary architecture for populating a multimedia system with detailed content specific information. Video source material 110 is provided to a media analysis/metadata extraction device 120. The media analysis/metadata extraction device extracts content specific index data from the provided video material using automatic media processing techniques such video indexing and/or audio indexing. The media analysis/metadata extraction device converts the video source material into video data and multimedia data for storage in a multimedia database and video database 140. Content specific index data determined by the media analysis/metadata extraction device is included in the multimedia data. Each logical unit of video source material (e.g., a television program, a video-tape, a corporate speech) is broken down by the media analysis/metadata extraction device into a distinct entry for the multimedia database and video database.

In addition, the media analysis/metadata extraction device may also break video source material into smaller entries based on topic or story boundaries of the video source material. The video source material may also be analyzed automatically to detect video shot boundaries and to record any associated closed caption information. Further, automated speech recognition, such as Large Vocabulary Automated Speech Recognition (LVASR) can be used to obtain a transcription for inclusion in the multimedia data. In another alternative, the content specific index data is extracted from the video data manually, a human functioning as that portion the media analysis/metadata extraction device that determines content specific index data.

Video data includes that data used to display the video source material 100 on a video device (i.e., the video itself). Multimedia data includes multimedia content data, which is data based on the content of the video data, such as content specific index data, for example, an index of select keywords referenced in the video data. Examples of multimedia content data include still images (e.g., images of a scene from a movie), preview videos (e.g., a theatrical trailer), detailed information about the video data (e.g., names of actors in a video program, the cinematography of the director of a video program), and the like. Multimedia data may also include metadata, which is other data used to index both the video data and multimedia data, such as the title of a movie, the name of a song, or the like. In addition to creating multimedia data, the media analysis/metadata extraction device also may digitize and compress the video source material for storage on the multimedia database and video database 140. For example, video data may be stored in a format such as MPEG-1, MPEG-2, MPEG-4, or other formats and delivered across the network at various bitrates. Preferably, multiple versions of the video data in various formats are stored so that the highest possible quality version may be later delivered to a consumer based on available bandwidth and the consumer's video device capabilities.

Ancillary source material 120 may also be provided to the media analysis/metadata extraction device 130 to improve the accuracy of indexing or to utilize other information suitable for indexing and retrieving video data. Examples of ancillary data include offline transcriptions, manual annotations, topic classifications, post-production scripts, metadata, genre classifications, and the like. With ancillary source material, the media analysis/metadata extraction device 130 would utilize both the video source material 110 and the ancillary source material 120 during the conversion into video data and multimedia data, including content specific index data, for storage in the multimedia database and video database 140.

For each video data (e.g., television program) in the video database corresponding multimedia data is stored in the multimedia database. Multimedia data that may be stored includes a program stream, image frames and associated metadata (e.g., time within broadcast that the frame was sample, type of video transition) representing each scene, program metadata including title, broadcaster, time and date of airing, closed caption text, automatic speech transcriptions, and various data structures. For example, to indicating pagination each multimedia data representation of video data can be divided into sets of HTML pages and data structures established that indicate the number of HTML pages, and the captions and images that appear on given page. Optionally, the multimedia data that is stored can include an offline transcription that has been synchronized with the video data.

A number of such sets of video data and corresponding multimedia data are stored in the multimedia database and video database. Index services, (e.g., MS Indexing Service) are used to provide full text search capability on either the closed caption text and/or the offline transcription. HTML metatags are included with the text so that relational queries can be supported (e.g., "find all video data containing the term "NASA" from the broadcaster "NBC" that are less than one year old.") The system combines the basic closed caption text and or speech transcription with the metadata to generate files that a server can use as content for searching. Once video data matching a consumer's query has been identified, application software generates a content rich interface for browsing the corresponding multimedia data and initiating video data playback.

In this manner, the invention provides a database of information relating to video material, facilitates navigation of such information (e.g., a plurality of television programs) and further, facilitates navigation with a particular item of such information, such as, a particular television program. An illustrative example of such a database of information is an archive of all television programs in a particular geographic regions for a seven-day period.

The multimedia database and video database may be individually stored on a multimedia server and video server, respectively. Alternatively, the multimedia server and video server can be one in the same server. In either event, the video server and the multimedia server are in communication with the media analysis/metadata extraction device 130, to receive video data and multimedia data, respectively. While centralizing the video database offers economies of scale and eases maintenance, the video data can be stored locally (i.e., proximite a consumer's video device). Additionally, hybrid embodiments are possible in which some of the video data is stored locally and other video data is stored remotely, perhaps in several different geographic locations. Such embodiments may be organized such that popular or frequently viewed video data is stored proximately locally to minimize network communication and congestion. Further, intelligent content distribution networks can be utilized to efficiently distribute the video data from the video database to consumers.

Figure 2:
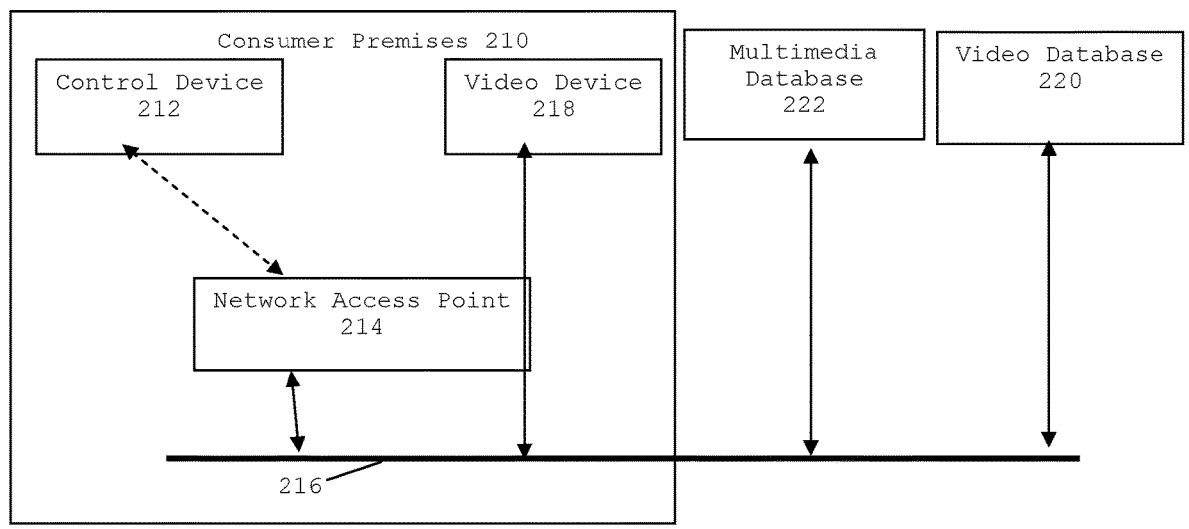
FIG. 2 is an exemplary network topology for implementing the invention.

FIG. 2 illustrates an exemplary network topology for implementing the invention. At a consumer premises 210, a control device 212 communicates via a network access point 214 over a network 216. The control device acts as a dynamic control pad for initiating video playback of content specific information and may be a suitably programmed Personal Digital Assistant (PDA) device. The control device is capable of inputting control command, communicating data, and playing multimedia data such as, preferably, still images, text, preview videos, or the like. Alternatively, the control device may have capabilities limited to textual display and not be able to play video material. The control device utilizes wireless data communications and may employ Bluetooth, IEEE 802.11b, infrared protocols, or other wireless protocols, to establish communication with the network access point. Alternatively, the control device can be a palm-top computer, a tablet computer, a lap-top computer, a desk top computer, or any device capable of display of the multimedia data and solicitation of consumer input and generating control queries and commands.

The network access point negotiates data communications between the control device and the network. The network preferably is an Internet Protocol (IP) network and may have bandwidth of 10 Mbps or greater. The control device communicates with the network and may establish communications at a bandwidth lower than that of the network proper, for example at a bandwidth under 100 Kbps.

Additionally, a video device 218 is located at the consumer premises 210. The video device can decode compressed digital video data and may be a television monitor, computer monitor, or the similar device for display video data. The video device communicates with the network using compatible protocols, as is known in the art. The video device may communicate with the network through a wireless connection that has sufficient bandwidth to support the playback of compressed digital video data. There may be more than one video device that may be controlled by the control device.

Video server 220 stores video database 140 and is interconnected with the network 216. The video server is capable of indexing and accessing the video database via methods known in the art. Multimedia server 222 stores the multimedia database 140 and is interconnected with the network 216. The multimedia server is capable of capable of indexing and accessing the multimedia database via methods known in the art. The multimedia server is also capable of generating content for remote devices. Together, the video data and the multimedia data comprise the content information for utilization by the consumer. During operation of the method of the invention, the consumer interacts with the control device and multimedia data displayed thereon and observes video data displayed on the display device.

From the consumer premises 210, the control device 212 communicates over the network 216 with the multimedia server 222. The multimedia server may be located remotely with respect to the consumer premises. In such an instance, the network may use Wide Area Network (WAN) or other network protocols to route packets between the control device and the multimedia server, as is known in the art. Using the control device, a consumer is able to selectively retrieve multimedia data located on the multimedia server. More than one multimedia server may be located on the network and communicated with in the same manner.

As described above in regard to FIG. 1, the multimedia data includes multimedia content data that is content specific data that is based on and corresponds to video data stored on a video server. Each video program having video data stored on a video server will have corresponding multimedia data pertaining to the content of its corresponding video data stored on at least one multimedia server. By viewing the multimedia content data for a particular multimedia data, the multimedia data is not limited to conventional metadata, such as a title, but also includes information pertaining to the content of the video data. A consumer may choose to retrieve a particular video program having particular video data to the video device located at the consumer premises. The multimedia data may be indexed and searched in a variety of ways, both consumer-defined and/or predefined by indexing software on the multimedia server. For example, the consumer may search for video programs having a particular actor or for video programs located on a particular video server.

After the user has selected multimedia data in order to view the corresponding video data for at least one video program, the control device 212 communicates with video server 220 over the network 216 to instruct the video server to retrieve and provide the desired video data to the video device 218. The video server 220 may be located remotely with respect to the consumer premises 210. In such an instance, the network 216 may use WAN or other network protocols to route packets between the control device and the video server, as is known in the art.

In other embodiments, the video device may be able to download video data or multimedia data and store such data locally within the video device, or utilize some other storage means at the consumer premises for the same purpose. Further, there may be more than one video server 220 located on the network 216, and video data for a particular video program may be located on more than one video server. The video data may be indexed in a variety of ways, as known in the art. It is also possible that the multimedia server and the video server are one in the same.

Figure 3:
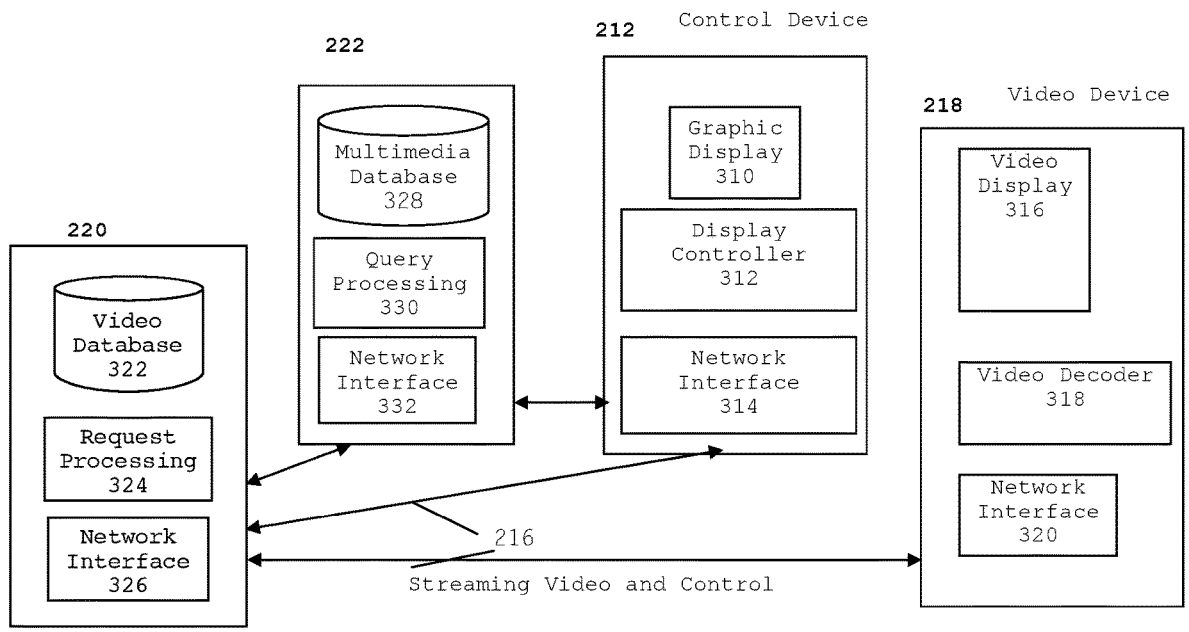
FIG. 3 illustrates additional detail of the exemplary network topology shown in FIG. 2.

FIG. 3 illustrates additional detail of the exemplary network topology shown in FIG. 2. The control device 212 includes a graphic display 310 which displays multimedia data, a display controller 312 which controls the consumer interface (display of multimedia data and input of consumer selections in response thereto), and a control device network interface 314 which interfaces the control device to the network. The video device includes a video display 316 which displays video data, a video decoder 318 which decodes compressed video data, and a video device network interface 320 which interfaces the video display to the network. The video server 220 includes a video database 322 which stores the video data, a request processing controller 324 which handles queries and instructions to the video server, and a video server network interface 326 which interfaces the video server to the network. The multimedia server 222 includes a multimedia database 328 which stores the multimedia data, a query processing controller 330 which handles queries and instructions to the multimedia server, and a multimedia server network interface 332 which interfaces the multimedia server to the network. The video server network interface 326, the multimedia server network interface 332, the control device network interface 314 and the video device network interface 320 are connected via the network 216. Communication between each of the network interfaces is accomplished as described above and via other methods known in the art.

FIGS. 4-10 are screen views for an exemplary control device and disclose one possible implementation of the invention. The control device provides an interface, such as a Graphical User Interface (GUI), for display of information and solicitation of consumer input/instruction as explained below in conjunction with FIG. 4-10. For initiation and control of video data playback, application software on the control device generates URLs, which pass parameters to a CGI application running under the HTTP server on the video device. A CGI syntax of name/value pairs is used for passing parameters from the control device to the video device.

Parameters include MediaURL, VideoDevice, StartTime, Volume, Reply, and Command.

MediaURL is a URL, URN, or URI indicating the video data stream. VideoDevice is an IP address name or number indicating the video device that is being directed to display the video data. StartTime indicates the video data play position in units since the start of the video data. Volume indicates volume amplitude on a liner scale. Replay indicates whether to send a status message response or issue a no response message. The Command parameter may take on one of several values. Those values include play (play the video data at the given StartTime), stop (stop the video data playback and blank the video display), mute (set volume to zero), volup (increase the volume by a predetermined number of units), voldown (decrease the volume by a predetermined number of units), volume (set the volume using the given Volume parameter) and pause (stop the video data playback, freezing the display on the current video frame), and other values within the skill of one in the art. The control device also queries the multimedia server and requests action of the video server to commend the search for and delivery of information of interest to the consumer.

Figure 4:
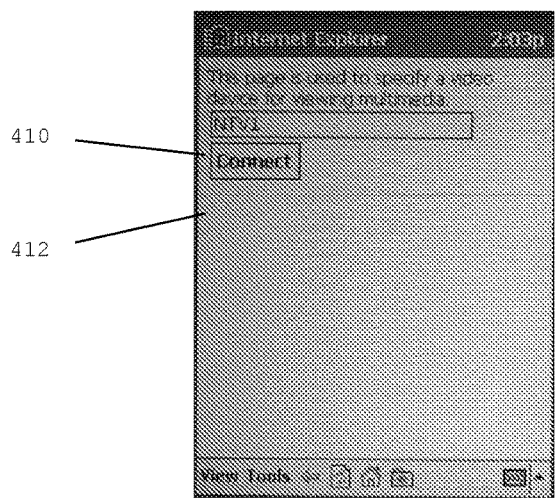
FIG. 4 illustrates an exemplary control device screen for specifying the video device that is to be controlled.

FIG. 4 illustrates an exemplary control device screen for specifying the video device that is to be controlled. The control device provides an input field 410 for the consumer to specify the video device that is to be controlled. In this example, the user has entered the video device name "NTV1". Also provided is a connection button 412, which, upon selection, instructs the control device that the video device indicated in the input field is to be provided video data. There may be more than one video device that may be controlled by the control device. Preferably, the control device provides a list of all available video devices to which the consumer has access. The list of available video device may be a predetermined list of device names maintained on a server. The list may be prepared at the time that each video device is installed. In addition, names entered by the consumer or selected previously can be presented to the consumer in a selectable list. Preferably each video device has a friendly name and a corresponding Domain Name Server (DNS) entry that maps the friendly name to an Internet Protocol (IP) address. Alternatively, a protocol similar to Address Resolution Protocol (ARP) can be used to determine a list of active video devices.

Figure 5:
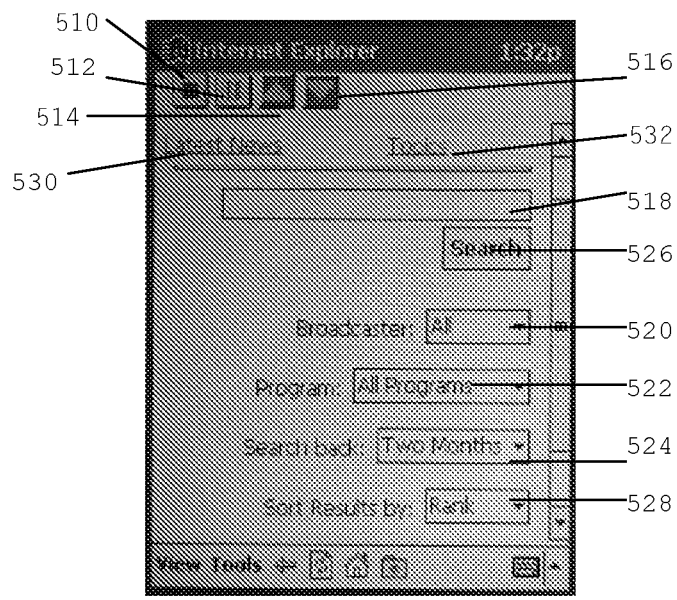
FIG. 5 illustrates an exemplary control device screen for the main search term selection screen (i.e., "home" screen)

FIG. 5 illustrates an exemplary control device screen for the main or "home" screen after the video device selection. Command icons for control of the control device are located at the top of the display screen. These icons are linked via CGI URLs to control commands for stop 510, pause 512, volume up 514, volume down 516. The command icons can be implemented as an HTML frame. Preferably, these icons remain at the top of the screen after a video device has been selected for control so that the consumer may assert control commands regardless of where the consumer is in a navigation session. Input fields are provide so that the consumer may enter a search term 518, and may restrict the search to a particular broadcaster 520, program 522 or date range 524. A search button 526 is also provided, and which, upon selection, initiates a search of multimedia data based on the input search term. An input field 528 for control the sorting of the result of a search of the multimedia data is preferably provided. Links for searches of the "latest news" 530 and hot "topics" 532 are also provided. Additionally, command icons for mute and other functions can be included with the icons illustrated. Further, a button for linking to a conventional numeric keypad display can be added to permit the consumer to easily select a live broadcast channel. A display of a status message indicating the currently playing content (perhaps by title and some indication of the playing time) can also be provided. Such a message can be displayed in a persistent manner similarly to the command icons.

Figure 6:
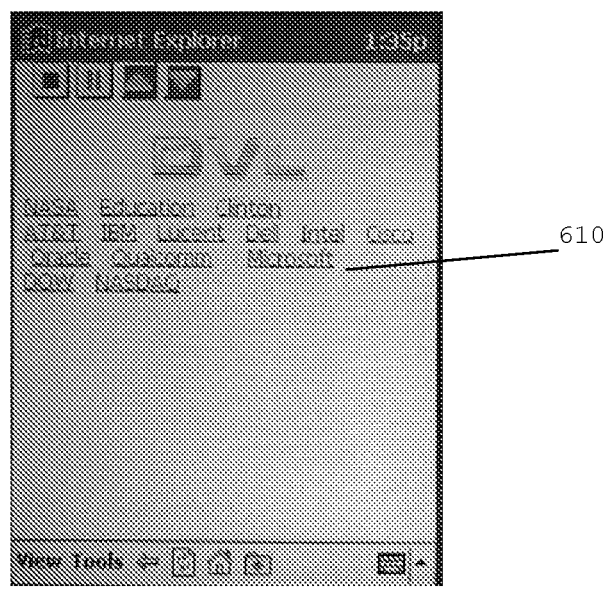
FIG. 6 illustrates an exemplary control device screen for an topics list of exemplary common search terms.

FIG. 6 illustrates an exemplary control device screen for a hot "topics" list of exemplary common search terms. When the consumer selects the "topics" link (532), the consumer is provided with links 610 listing common search terms. If one of these hot topic links 610 is selected, the control device undertakes a search as if the term was entered into the search term input field (518).

Figure 7:
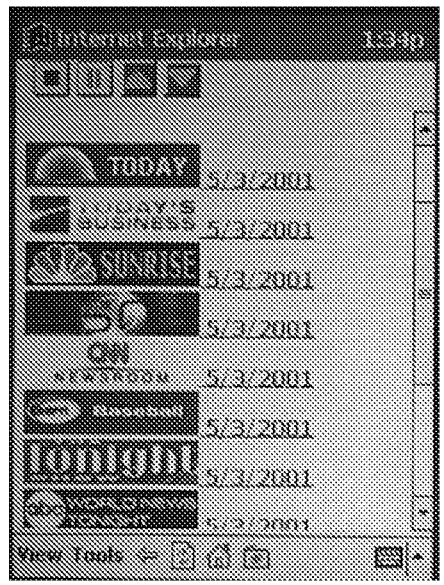
FIG. 7 illustrates an exemplary control device screen of multimedia data indicating video data relevant to a particular search term.

FIG. 7 illustrates an exemplary control device screen of multimedia data indicating video data relevant to a particular search term. After a search term has been instructed (e.g., either by entering a search term on the main screen and clicking search button (518, 526) or by selecting a link on the topic list (610)), a search of the multimedia data, specifically content specific index data, is undertaken and a listing of multimedia data describing, in some manner, video data relevant to the search term is displayed. Multimedia data displayed may include a program name, date and time of airing, network aired on, and the like. The display of this multimedia data conveys a summary or condensed representation pertaining to the content of the video data for browsing and serves as a dynamic control pad for initiating of video data playback. The consumer then selects a particular video data (e.g., a television program) of interest from this displayed list of condensed representations pertaining to the content of the video data.

Figure 8:
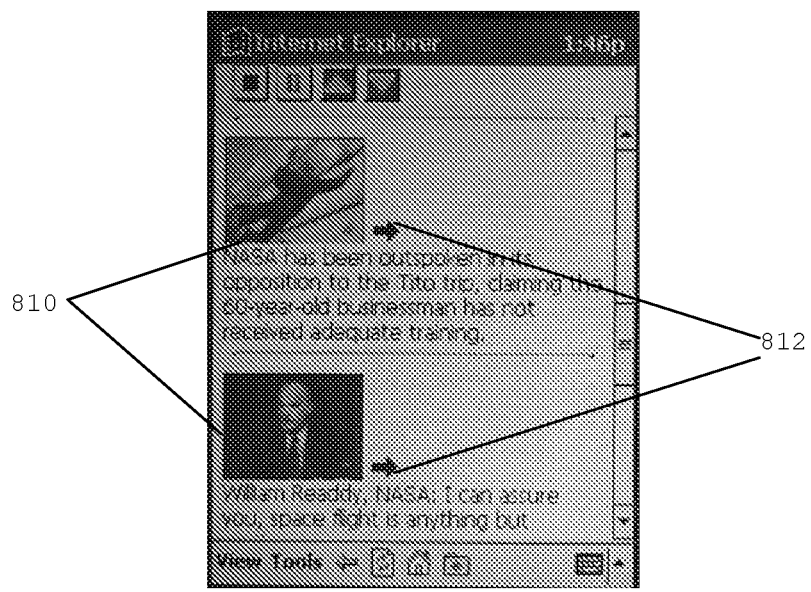
FIG. 8 illustrates an exemplary control device screen of multimedia data indicating portions of individual video data relevant to a particular search term.
Figure 9:
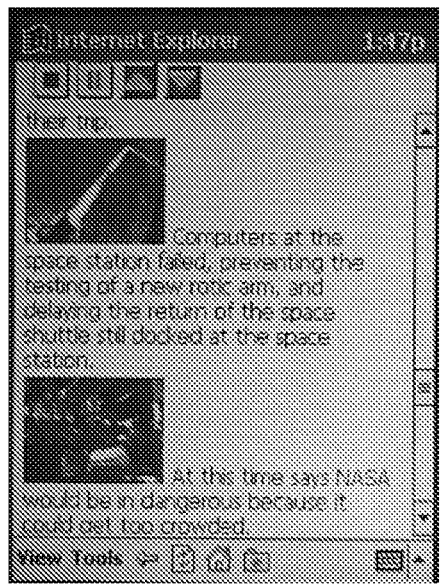
FIG. 9 illustrates an exemplary control device screen of an interface for browsing video material that has been close-captioned.

FIG. 8 illustrates an exemplary control device screen of multimedia data indicating information pertaining to the content individual video data entries in the video data database that are relevant to a particular search term. After selecting a particular video data (e.g., a program) from a first list of multimedia data, such as condensed representations of programs (FIG. 7), a second list of relevant multimedia data extracted from selected video data is displayed. In the illustrated example, "NASA" was the search term and the system has selected multimedia data, for example, excerpts of pictorial transcriptions 810, that contains the term "NASA". If the consumer selects one of the displayed excerpts, the video data corresponding to the excerpt will be provided to the video device for playback at that point in the video data corresponding to the selected excerpt. If the consumer selects an arrow icon 812, additional multimedia data, for example the full pictorial transcription, of the selected excerpt is displayed as shown in FIG. 9. Using the full pictorial transcription displayed in FIG. 9, the consumer may scroll the display and select a other non-linear points in the video data (e.g., program) at which to initiate video data playback on the display device.

If the consumer selects the "Latest News" link (528), a list of multimedia data pertaining to the content of the most recent video data (e.g., most recently aired video programs) in the video database will be displayed in reverse chronological order. Such a list would appear similar to the list illustrated in FIG. 7. Upon selecting from this list of multimedia data, a particular video data of particular interest, the consumer may be directly provided with the full pictorial transcription of the selected excerpt as shown in FIG. 9.

FIG. 9 illustrates an exemplary control device screen of an interface for browsing video material that has been close-captioned. The browsing capability includes a display of multimedia data, such as text extracts and corresponding key frame images, with hyperlinks for navigation to other points of interest within the video data corresponding to the displayed multimedia data, or other multimedia data additionally relevant video data of interest. Templates through which the application software of the control device maps the multimedia data govern the form as well as the appearance of the multimedia data.

Figure 10:
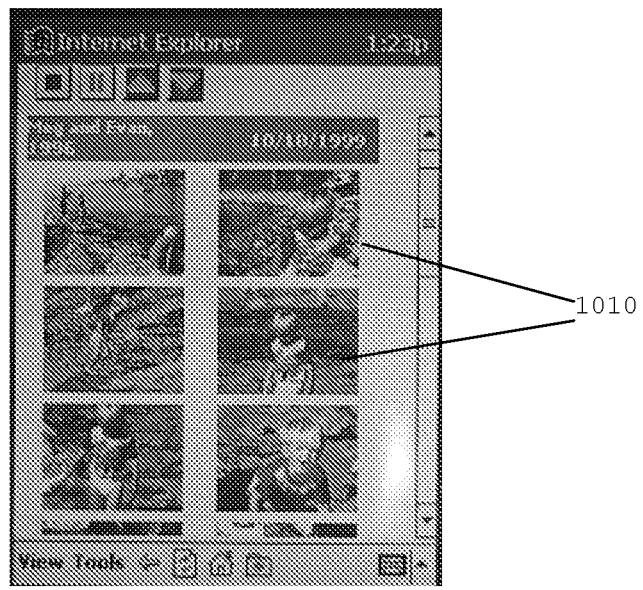
FIG. 10 illustrates an exemplary control device screen of an interface for browsing video material that has not been close-captioned.

FIG. 10 illustrates an exemplary control device screen of an interface for browsing video material that has not been close-captioned or otherwise transcribed. In the illustrated example, the displayed multimedia data is arranged into a series of thumbnail images 1010 or "contact sheets." The consumer may scroll the displayed thumbnail images, which are representations of non-linear points within the video data, and select a particular point in the video data (e.g., video program), corresponding to the displayed multimedia data, at which to initiate video data playback. Video data playback is initiated at the point in the video data corresponding to the selected thumbnail image.

It is the intent of the invention to provide a system and method that facilitates searching and browsing of video material. FIGS. 1-10 describe a system and method for accessing multimedia data and video data that facilitates navigation of a large aggregate of video material, and further, navigation within a particular selection of video material on a server or a database. By allowing a consumer to see a condensed representation of video data conveyed by multimedia data, including multimedia content specific data, the consumer is able to make informed decisions as to the relevance or desirability of retrieving and viewing an entire video data entry. Such a system minimizes requests for irrelevant video material, thus minimizing the load on the network, maximizing available bandwidth, and saving consumer time and expense.

The invention enables the creation of user-friendly, network-based, video-on-demand entertainment and information services. It finds application in self-contained home entertainment system and pay-per-view video services on-the-go (e.g., airport) where a consumer uses a control device to find/select video or multimedia content to be delivered to a separate device.

It should be understood that, for convenience, the above description is representative of embodiments according to the principles of the invention without exhaustively enumerating all possible embodiments. Other embodiments may result from combination of various alternative embodiments described herein and, as will be appreciated, are within the scope of the following claims. The figures described herein are for illustrative purposes only, it being possible to implement the invention with user interfaces that differ considerably in appearance from the one depicted here. In fact, it would be desirable to have a plurality of interfaces that are customizable based upon the preferences of user or those of content providers or broadcasters.

What is claimed is:

1. A method comprising:
searching by a server, in response to receiving a search term from a user via a user interface of a mobile control device, a plurality of multimedia data stored in a database at a multimedia server to generate matched multimedia data associated with the search term, the matched multimedia data comprising video content and one or more of a condensed representation pertaining to the video content, offline transcriptions, and closed captions associated with the video content, wherein the condensed representation, the offline transcriptions, and the closed captions associated with the video content are stored in the database, wherein the matched multimedia data is generated by:

analyzing, by a media metadata extraction device, the video content and identifying video shot boundaries in the video content;

extracting, by the media metadata extraction device, from the video content, (1) text from the closed captions and (2) a frame corresponding to the text; and extracting, by the media metadata extraction device, small segments of organized multimedia data based on topic boundaries and the video shot boundaries, each small segment of the small segments being smaller than a respective program containing the small segments, to yield the matched multimedia data;

displaying, with the matched multimedia data and via the user interface, a plurality of command icons for controlling which display device of a plurality of external devices to display a selected video content;

receiving, via the user interface of the mobile control device and from the user, a choice from the matched multimedia data to yield the selected video content; and receiving, via the user interface of the mobile control device, a user input to display the selected video content on one of a first display device and a second display device of the plurality of external devices, wherein the plurality of command icons remains on the user interface of the mobile control device after one of the first display device and the second display device has been selected for control so that the user can assert control commands regardless of wherein the user is in a navigation session.

2. The method of claim 1, wherein the user interface comprises a graphical user interface.

3. The method of claim 1, wherein the plurality of external devices comprises the multimedia server, a video server, and a plurality of video devices.

4. The method of claim 1, wherein the selected video content is indexed by one of a title, a length, a rating, and a scene.

5. The method of claim 1, wherein the search term is received as an utterance.

6. The method of claim 1, wherein the matched multimedia data comprises a second condensed representation pertaining to the selected video content, an offline transcription, and closed captions associated with the selected video content.

7. The method of claim 1, wherein the database comprises ancillary data used to index the selected video content.

8. The method of claim 7, wherein the ancillary data comprises one of offline transcriptions, manual annotations, topic classifications, post-production scripts, metadata, and genre classifications.

9. A system comprising:
a processor; and
a computer-readable storage medium having instructions stored which, when executed by the processor, cause the processor to perform operations comprising:
searching, in response to receiving a search term from a user via a user interface of the system, a plurality of multimedia data stored in a database at a multimedia server to generate matched multimedia data associated with the search term, the matched multimedia data comprising video content and one or more of a condensed representation pertaining to the video content, offline transcriptions, and closed captions associated with the video content, wherein the condensed representation, the offline transcriptions, and the closed captions associated with the video content are stored in the database, wherein the matched multimedia data is generated by:

analyzing, by a media metadata extraction device, the video content and identifying video shot boundaries in the video content;

extracting, by the media metadata extraction device, from the video content, (1) text from the closed captions and (2) a frame corresponding to the text; and extracting, by the media metadata extraction device, small segments of organized multimedia data based on topic boundaries and the video shot boundaries, each small segment of the small segments being smaller than a respective program containing the small segments, to yield the matched multimedia data;

displaying, with the matched multimedia data and via the user interface, a plurality of command icons for controlling which display device of a plurality of external devices to display a selected video content;

receiving, via the user interface of the system and from the user, a choice from the matched multimedia data to yield the selected video content; and receiving, via the user interface of the system, a user input to display the selected video content on one of a first display device and a second display device of the plurality of external devices, wherein the plurality of command icons remains on the user interface of the system after one of the first display device and the second display device has been selected for control so that the user can assert control commands regardless of wherein the user is in a navigation session.

10. The system of claim 9, wherein the user interface comprises a graphical user interface.

11. The system of claim 9, wherein the plurality of external devices comprises the multimedia server, a video server, and a plurality of video devices.

12. The system of claim 9, wherein the selected video content is indexed by one of a title, a length, a rating, and a scene.

13. The system of claim 9, wherein the search term is received as an utterance.

14. The system of claim 9, wherein the matched multimedia data comprises a second condensed representation pertaining to the selected video content, an offline transcription, and closed captions associated with the selected video content.

15. The system of claim 9, wherein the database comprises ancillary data used to index the selected video content.

16. The system of claim 15, wherein the ancillary data comprises one of offline transcriptions, manual annotations, topic classifications, post-production scripts, metadata, and genre classifications.

17. A computer-readable storage device having instructions stored which, when executed by a system, cause the system to perform operations comprising:

searching, in response to receiving a search term from a user via a user interface of the system, a plurality of multimedia data stored in a database at a multimedia server to generate matched multimedia data associated with the search term, the matched multimedia data comprising video content and one or more of a condensed representation pertaining to the video content, offline transcriptions, and closed captions associated with the video content, wherein the condensed representation, the offline transcriptions, and the closed captions associated with the video content are stored in the database, wherein the matched multimedia data is generated by:

analyzing, by a media metadata extraction device, the video content and identifying video shot boundaries in the video content;

extracting, by the media metadata extraction device, from the video content, (1) text from the closed captions and (2) a frame corresponding to the text; and extracting, by the media metadata extraction device, small segments of organized multimedia data based on topic boundaries and the video shot boundaries, each small segment of the small segments being smaller than a respective program containing the small segments, to yield the matched multimedia data;

displaying, with the matched multimedia data and via the user interface, a plurality of command icons for controlling which display device of a plurality of external devices to display a selected video content;

receiving, via the user interface of the system and from the user, a choice from the matched multimedia data to yield the selected video content; and receiving, via the user interface of the system, a user input to display the selected video content on one of a first display device and a second display device of the plurality of external devices, wherein the plurality of command icons remains on the user interface of the system after one of the first display device and the second display device has been selected for control so that the user can assert control commands regardless of wherein the user is in a navigation session.

18. The computer-readable storage device of claim 17, wherein the plurality of external devices comprises the multimedia server, a video server, and a plurality of video devices.

19. The computer-readable storage device of claim 17, wherein the selected video content is indexed by one of a title, a length, a rating, and a scene.

20. The computer-readable storage device of claim 17, wherein the search term is received as an utterance.

* * * * *